Patented June 17, 1947

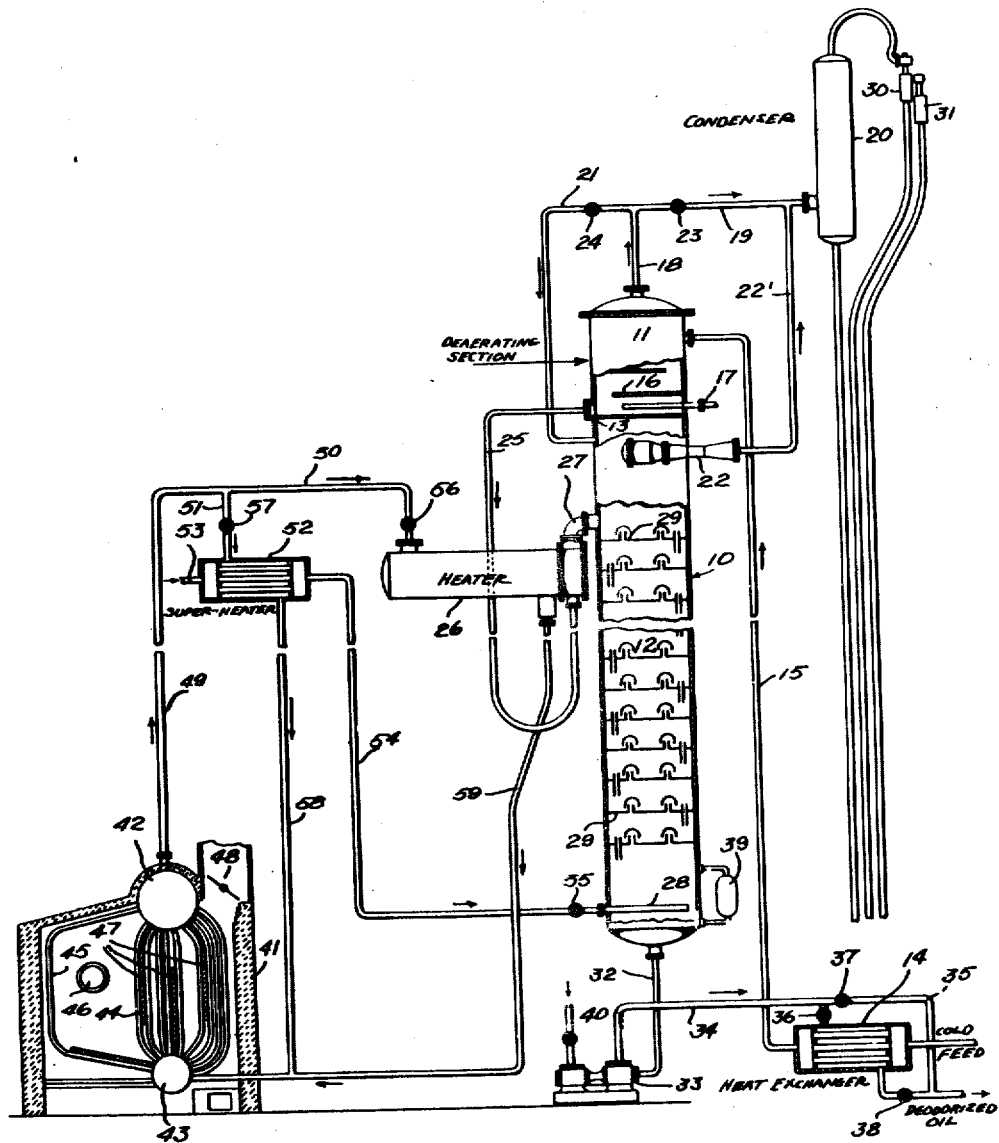

2,422,185

UNITED STATES PATENT OFFICE 2,422,185

APPARATUS FOR DEODORIZATION OF ANIMAL OILS AND VEGETABLE OILS

Dion K. Dean, Rahway, N. J., assignor to Foster Wheeler Corporation, New York, N. Y., a corporation of New York Application August 20, 1942, Serial No. 455,413

7 Claims. (Cl. 23—262)

This invention relates generally to the art of refining oils, and more particularly pertains to an improved process of, and apparatus for, the continuous deodorization of animal oils and vegetable oils such as cotton seed oil, corn oil, cocoanut oil and the like. The deodorization of such oils is mainly for the purpose of producing certain edible products, although not necessarily limited thereto, by the removal from the raw oil of dissolved air and other undesirable volatile substances that would otherwise adversely effect the product with respect to color and taste, or cause rapid deterioration.

Heretofore, the generally accepted method of deodorizing vegetable oils has been accomplished by the use of the batch system in which a tank is filled with a charge of cold raw oil, which is thereupon subjected to the desired operating vacuum and then is heated by means of heating coils within the tank, while at the same time stripping steam is forced through the body of oil. By this method, the temperature is gradually built up to the maximum in the presence of vacuum, and consequently some of the volatile constituents including air are released, and escape from the oil before it attains its maximum temperature. This is an advantage to the extent that the oil is not highly heated in the presence of oxygen and thus tends to prevent oxidation. However, heating the oil in bulk is a relatively slow process and has the disadvantage that certain other chemical changes may take place as a result of the extended heating period. Moreover, only the topmost part of the oil is subjected to full vacuum since all other portions of the body of oil are under some hydrostatic head. The action of the direct stripping steam will, of course, cause a circulation of the oil and thereby eventually bring all particles to the top surface, but this takes considerable time, in consequence of which the deodorization period is undesirably extended, with the adverse results referred to.

Various attempts have been made to make use of a continuous system of deodorization by heating the raw oil and then exposing it successively in relatively thin layers of large area to sub-atmospheric pressure, while at the same time contacting the oil with stripping steam, with the thought that complete deodorization might thus be brought about in a much shorter period of time than would be the case with a batch system, thereby minimizing the deleterious chemical reactions produced by subjecting the body of the oil to a prolonged high temperature heating. Generally, these continuous systems have not proven highly successful since they have lacked the one desirable element inherent in the batch system, namely, the initial release of the air and certain undesirable volatile constituents at low temperature.

The present invention overcomes the aforementioned disadvantages of prior practice by causing the raw oil which is to be deodorized, to pass continuously through a preliminary deaerating chamber before being heated at all, or before being heated to a sufficient temperature to cause any adverse chemical effect, to remove a portion of the vapors and especially the air before the oil undergoes the high temperature treatment necessary to complete deodorization. With this method, steam consumption and operating costs are reduced as compared with prior methods, and the size of the apparatus required for carrying out the method is reduced and the cost thereof is correspondingly less.

For a better understanding of the particular features that characterize the invention, reference may be had to the following description considered in connection with the accompanying drawing, in which the single figure is substantially a vertical sectional view illustrating diagrammatically a preferred form of apparatus for carrying out the process of the invention.

Referring to the drawing, the column 10 comprises a comparatively small deaerating section 11 and a main deodorizing section 12, the two sections being separated by a division plate or partition 13. The raw feed which may be either cold, or moderately preheated in the heat exchanger 14, flows through conduit 15 to the deaerating section 11. From the upper portion of the deaerating section the oil flows downwardly over a plurality of trays 16, which may be bubble trays although they are not so illustrated. If desired, stripping steam may be injected into the lower portion of the deaerating section through steam connection 17. Steam and vapors and non-condensible gases leave the deaerating section through vapor line 18, and may either flow through the vapor line 19 directly to the barometric condenser 20, or through the vapor line 21 to the suction end of the thermo-compressor 22, located in the upper portion of the deodorizing section 12. These paths of flow are controlled by the valves 23 and 24, and it will be apparent that when valve 23 is closed and valve 24 is open the oil in the deaerating section will be subjected to a higher vacuum than when the reverse is true due to the action of the compressor 22. Conduit 19 and its valve 23 may be omitted if desired, in which event the vapors and gases from the deaerating section will pass through conduit 21 to the deodorizing section and will be removed therefrom by the steam jet 22. Unvaporized oil leaves the deareating section through conduit 25 and enters the heater 26 in which the oil is heated to the temperature desired, and then is introduced through connection 27 into the deodorizing section, where due to presence of a very high vacuum produced by compressor 22, and the stripping action of the steam admitted at 28, the remaining undesirable volatile constituents are released from the oil as it flows downwardly in relatively thin streams over the bubble trays 29 to the bottom of the column. The steam and vapors, and non-condensible gases discharged by the compressor pass through vapor lines 22' and 19 to the condenser 20 where steam and vapors are condensed and properly disposed of, while the non-condensible vapors or gases, or both, are withdrawn and eliminated by a two-stage air pump comprising the inter-condenser 30 and the after-condenser 31. The finished product is removed from the section 12 through conduit 32 by pump 33 and flows either directly to storage through conduits 34 and 35, or by the proper adjustment of valves 36 and 37, through the tubular heat exchanger 14 in heat exchange relationship with the raw feed, thus utilizing valuable heat that otherwise would be lost, although it will be understood that the raw feed should not be heated in excess of a moderate temperature. Check valve 38 prevents the back flow of any of the finished product. When for any reason the oil in the bottom of section 12 falls below the operating level indicated by the float control 39, the pump 33 is shut down, and the valve 40, which admits operating steam to pump 33, is closed.

Reference character 41 designates generally a boiler or vapor generator for a high boiling point liquid such as diphenyl, diphenyl oxide or an equivalent, to be used as a heat transfer agent or a heating medium for the oil flowing from the deaerating section to the deodorizer, and for superheating the stripping steam used in the system. Other heating methods may be employed if desired. The boiler 41 comprises an upper drum 42 and a lower drum 43 connected by banks of heating tubes 44 and tubes 45. Heat is supplied by burner 46 and the products of combustion, after being directed over the heating surface by baffles 47, enter outlet flue 48. Vapor from the boiler is conducted by conduits 49 and 50 to the oil heater 26, and by the conduits 49 and 51 to the steam superheater 52. Both of these heaters are of the shell and tube type, and the oil which flows through the tubes in the heater 26, absorbs heat from the vapors flowing between said tubes and the shell. The steam entering the superheater at 53 from any suitable source, is superheated in a similar manner, and is then conducted by the steam line 54 to the perforated discharge connection 28 at the bottom of the deodorizer. If desired, the superheater 52 may also be connected by a steam line with the perforated steam discharge connection 17 in the deaerating section. The steam flow through these lines may be controlled by valves, as indicated at 55, while the flow of vapor to the oil heater 26 and superheater 52 is controlled by the valves 56 and 57 respectively. The vapor that has been cooled or condensed in the heaters is returned to the boiler by the conduits 58 and 59 and is reheated in a continuous cycle during normal operation.

The numerous advantages of this improved process and the arrangement of the component parts of the system described will be readily apparent. Since a considerable volume of the air and other volatile constituents will be released from the raw oil, while cold or relatively cool, in the deaerating section 11 by means of the vacuum which can be produced therein either by the condenser, or to a greater extent by the compressor, it is obvious that the volume of volatiles remaining in the oil to be released will be substantially reduced, and therefore the duty and capacity required of the main deodorizer will be less. In consequence, materially less stripping steam will be required, and the time during which it would otherwise be necessary to subject the oil to high temperature heating will be shortened, thus further preventing undesirable chemical reactions and insuring the product against oxidation. Additionally, due to the fact that considerably less stripping steam is used by the deodorizer than would be the case if there were no preliminary deaeration of the oil, the size, and therefore the cost of both the compressor and condenser, can be reduced.

It is to be noted that the use of stripping steam in the deaerating section is of only secondary importance, as normally either the moderate vacuum imposed on the oil by the condenser or the high vacuum produced by the compressor when the valves 23 and 24 are properly adjusted, is sufficient to bring about the desired deaerating effect as the oil flows downwardly from the inlet over the trays 16 to the bottom of the section.

Although an external heater is shown for the oil as it flows between the deaerating section and the deodorizer, and also an external heat exchanger for preheating the raw feed when desired, it is possible, and might in some cases be desirable to place a heating coil or coils within either the deaerating or deodorizing sections, or within both, to perform the functions of the external heaters shown. Such heating coils might be supported just above the topmost tray or in a lower portion of either section.

This application is a continuation-in-part of application Serial No. 129,980, filed March 10, 1937.

It will be apparent that various other modifications may be made in the form of the apparatus herein disclosed and in the steps of the method herein described without departing from the spirit of the invention, which is not to be limited excepting by the scope of the appended claims.

What is claimed is:

1. Apparatus for the continuous deodorization of animal or vegetable oils comprising a column, partition means for dividing the column intermediate its ends, a deaerating section above said partition means, a deodorizing section below said partition means, means for continuously introducing oil into the upper part of the deaerating section, means for introducing steam into the lower part of the deaerating section for countercurrent contact with the oil introduced therein, means for maintaining a vacuum in the deaerating section to cause air to be removed from the oil flowing through said section and to be removed from said section, a heater, a conduit connected with the lower part of the deaerating section and with the heater through which oil is continuously withdrawn from the deaerating section and is conducted to the heater, another conduit connecting the heater and the upper part of the deodorizing section through which heated oil is delivered to the deodorizing section, means for introducing steam into the lower part of the deodorizing section for counter-current contact with the heated oil introduced therein, means for maintaining a vacuum in the deodorizing section, and means for continuously withdrawing deodorized oil from the deodorizing section.

2. Apparatus for the continuous deodorization of animal or vegetable oils comprising a column, partition means for dividing the column intermediate its ends, a deaerating section above said partition means, a deodorizing section below said partition means, means for continuously introducing oil into the upper part of the deaerating section, means for introducing steam into the lower part of the deaerating section for counter-current contact with the oil introduced therein, means for maintaining a vacuum in the deaerating section to cause air to be removed from the oil flowing through said section and to be removed from said section, a heater, a conduit connected with the lower part of the deaerating section and with the heater through which oil is continuously withdrawn from the deaerating section and is conducted to the heater, means for vaporizing a relatively high boiling point liquid, means for conducting vapor of said liquid to said heater for passage therein in indirect heat exchange relationship with the oil therein, another conduit connecting the heater and the upper part of the deodorizing section through which heated oil is delivered to the deodorizing section, means for introducing steam into the lower part of the deodorizing section for counter-current contact with the heated oil introduced therein, means for maintaining a vacuum in the deodorizing section, and means for continuously withdrawing deodorized oil from the deodorizing section.

3. Apparatus for the continuous deodorization of animal or vegetable oils comprising a column, partition means for dividing the column intermediate its ends, a deaerating section above said partition means, a deodorizing section below said partition means, means for continuously introducing oil into the upper part of the deaerating section, a heater, a conduit connected with the lower part of the deaerating section and with the heater through which oil is continuously withdrawn from the deaerating section and is conducted to the heater, another conduit connecting the heater and the upper part of the deodorizing section through which heated oil is delivered to the deodorizing section, means for introducing steam into the lower part of the deodorizing section for counter-current contact with the heated oil introduced therein, a steam jet having its suction connected with the upper part of the deodorizing section, a conduit connecting the upper part of the deaerating section with the upper part of the deodorizing section, a condenser, a conduit connecting the discharge of the steam jet with the condenser, and means for continuously withdrawing deodorized oil from the deodorizing section.

4. Apparatus for the continuous deodorization of animal or vegetable oils comprising a column, partition means for dividing the column intermediate its ends, a deaerating section above said partition means, a deodorizing section below said partition means, means for continuously introducing oil into the upper part of the deaerating section, a heater, a conduit connected with the lower part of the deaerating section and with the heater through which oil is continuously withdrawn from the deaerating section and is conducted to the heater, means for vaporizing a relatively high boiling point liquid, means for conducting vapor of said liquid to said heater for passage therein in indirect heat exchange relationship with the oil therein, another conduit connecting the heater and the upper part of the deodorizing section through which heated oil is delivered to the deodorizing section, means for introducing steam into the lower part of the deodorizing section for counter-current contact with the heated oil introduced therein, a steam jet having its suction connected with the upper part of the deodorizing section, a conduit connecting the upper part of the deaerating section with the upper part of the deodorizing section, a condenser, a conduit connecting the discharge of the steam jet with the condenser, and means for continuously withdrawing deodorized oil from the deodorizing section.

5. Apparatus for the continuous deodorization of animal or vegetable oils comprising a column, partition means for dividing the column intermediate its ends, a deaerating section above said partition means, a deodorizing section below said partition means, means for continuously introducing oil into the upper part of the deaerating section, a heater, a conduit connected with the lower part of the deaerating section and with the heater through which oil is continuously withdrawn from the deaerating section and is conducted to the heater, another conduit connecting the heater and the upper part of the deodorizing section through which heated oil is delivered to the deodorizing section, means for introducing steam into the lower part of the deodorizing section for counter-current contact with the heated oil introduced therein, a steam jet having its suction connected with the upper part of the deodorizing section, a conduit connecting the upper part of the deaerating section with the upper part of the deodorizing section, a condenser, a conduit for connecting said conduit between the deaerating and deodorizing sections with the condenser, a valve for controlling the last mentioned conduit, a valve for controlling the conduit between the deaerating and deodorizing sections, a conduit connecting the discharge of the steam jet with the condenser, and means for continuously withdrawing deodorized oil from the deodorizing section.

6. Apparatus for the continuous deodorization of animal or vegetable oils comprising a column, partition means for dividing the column intermediate its ends, a deaerating section above said partition means, a deodorizing section below said partition means, means for continuously introducing oil into the upper part of the deaerating section, a heater, a conduit connected with the lower part of the deaerating section and with the heater through which oil is continuously withdrawn from the deaerating section and is conducted to the heater, another conduit connecting the heater and the upper part of the deodorizing section through which heated oil is delivered to the deodorizing section, means for introducing steam into the lower part of the deodorizing section for counter-current contact with the heated oil introduced therein, a steam jet having its suction connected with the upper part of the deodorizing section, a conduit connecting the upper part of the deaerating section with the upper part of the deodorizing section, and means for continuously withdrawing deodorized oil from the deodorizing section.

7. Apparatus for the continuous deodorization of animal or vegetable oils comprising a column, partition means for dividing the column intermediate its ends, a deaerating section above said partition means, a deodorizing section below said partition means, means for continuously introducing oil into the upper part of the deaerating section, a heater, a conduit connected with the lower part of the deaerating section and with the heater through which oil is continuously withdrawn from the deaerating section and is conducted to the heater, means for vaporizing a relatively high boiling point liquid, means for conducting vapor of said liquid to said heater for passage therein in indirect heat exchange relationship with the oil therein, another conduit connecting the heater and the upper part of the deodorizing section through which heated oil is delivered to the deodorizing section, means for introducing steam into the lower part of the deodorizing section for counter-current contact with the heated oil introduced therein, a steam jet having its suction connected with the upper part of the deodorizing section, a conduit connecting the upper part of the deaerating section with the upper part of the deodorizing section, and means for continuously withdrawing deodorized oil from the deodorizing section.

DION K. DEAN.

REFERENCES CITED

The following references are of record in the file of this patent:

UNITED STATES PATENTS

| Number | Name | Date |
|---|---|---|
| 1,592,112 | Lamy-Torrilhon | July 13, 1926 |
| 1,961,211 | Graham | June 5, 1934 |
| 2,000,886 | Dow | May 7, 1935 |
| 2,136,774 | Hickman | Nov. 15, 1938 |